Oct. 9, 1962  D. K. ROBERTSON  3,057,052
SEAL SETTING TOOL
Filed June 23, 1960

INVENTOR.
DENNIS K. ROBERTSON
BY
ATTORNEY

United States Patent Office 3,057,052
Patented Oct. 9, 1962

3,057,052
SEAL SETTING TOOL
Dennis K. Robertson, 1246 Piedmont Ave., Atlanta, Ga.
Filed June 23, 1960, Ser. No. 38,348
5 Claims. (Cl. 29—275)

This relates to a seal setting tool, and particularly to a grease seal setting tool of the sort used to drive a circular grease seal evenly into place in alignment into a bearing or the like in which it is permanently fitted.

More specifically, the present tool is described generally as a self-positioning hand operated tool which is adapted to have one end placed against the seal and to have the other end struck or tapped by an instrument such as a hammer to set the seal. In one preferred embodiment, the tool comprises a striking head against which a tap or blow from a hammer or mallet may be struck. From the striking head, there extends four adjustable legs arranged in substantially conical shape with one of the ends of each thereof resiliently and movably attached to the striking head and with the other of the ends of each thereof having a small seal-setting foot member thereon positionable against an arc segment of the seal, which is to be seated. Each leg is mounted on the striking head for limited movement therein and is attached to another portion of the head by means of a resilient spring, whereby each leg has limited movement resisted by spring means, so that when the tool seal-setting feet, each of which occupies a portion of the arc segment of the seal, is placed against the seal and held in the hand, the tool legs and seal-setting feet will assume an aligned position on the seal to distribute the force of the blow in such a manner as to drive the seal in alignment in place in its circular aperture.

One primary disadvantage of prior art grease seal setting devices is that they are so inflexible and so rigid in construction that one must be very careful and very well versed in the use of the tool before applying it to the seal, particularly if the seal is out-of-alignment, or otherwise the force used to set the seal in place will be unevenly distributed on the seal, causing it to warp or bend as it is inserted, which later on permits grease to leak from the seal and dirt to enter in under the seal. The aforementioned instant device is calculated and arranged in such a novel and unique manner as to inherently position on the seal in accordance with the position of the seal on the bearing or shaft to which it is applied, and then the resilient legs of the device will cause a more even distribution of the force as the seal is driven into place, so as to distribute it evenly around the seal and to cause the seal to assume a properly aligned position into the aperture into which it is fitted.

A primary object of this invention is to provide a device with some resiliency constructed therein for driving a seal in place.

An additional object of this invention is found in the construction whereby the force delivered on the head of the tool is distributed on several flexible leg members of the tool, which in turn have arc segments distributing the force around the seal for seating same in place.

Still another object of this invention resides in the particular positioning of the legs of the tool in the tool head and the manner of fastening them in place with a resilient strip, whereby limited but controlled movement is obtained in the operation of the legs.

Other and further objects and advantages of my invention will become apparent upon reading the following specification taken in conjunction with the accompanying drawings, in which.

Figure 1:
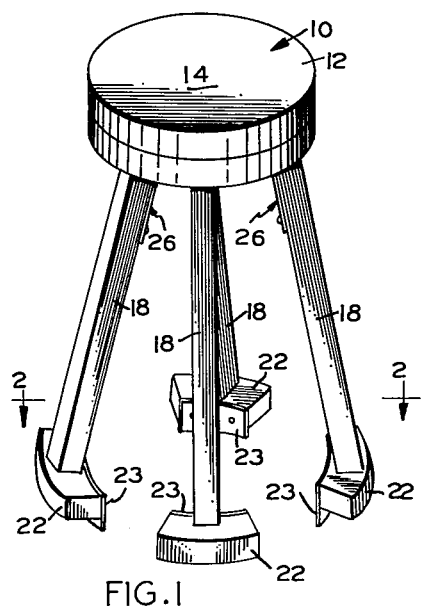
FIG. 1 is a perspective view of the tool of my invention.
Figure 2:
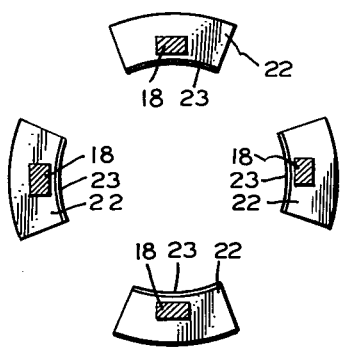
FIG. 2 is a cross-sectional view taken substantially along line 2—2 in FIG. 1.
Figure 3:
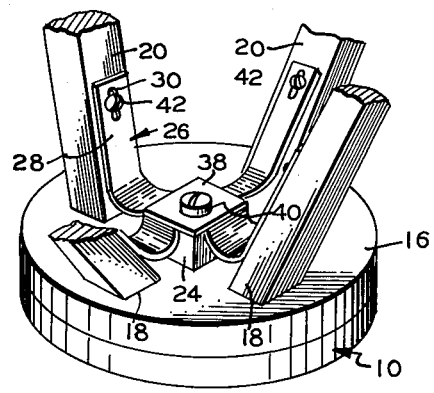
FIG. 3 is a perspective view of the tool shown in FIG. 1 inverted from the FIG. 1 position to show the underside of the head thereof and having the bottom portion of the legs broken away.

Referring initially to FIG. 1, the tool designated generally by the numeral 10 comprises a thick, circular driving head member 12, having a flat face 14 thereon, which is adapted to be struck or tapped on the surface thereof, as by a mallet or a hammer. The underside 16 (see FIG. 3) of the head 12 is of generally flat formation and has positioned therein four legs 18 extending from the head and having four recessed grooves or indentations forming sockets 20, into which is fitted the upper end of each of a respective leg member 18. The size of the leg members 18 is such that there is a loose fit between each of them and its respective opening 20 in the head 12 so as to permit some limited, flexible movement therein for the purpose of adjustment which has already been mentioned in the introduction hereof and which will become more apparent hereinafter. Positioned on the bottom of each of the leg members 18 is an arc segment foot seal-setting member 22 and together all of the outer faces of the arc segments 22 define a broken circle and a circular plane face. Each foot 22 has a small, arcuate metal plate 23 riveted or otherwise attached to the inside thereof to protrude outwardly onto the inner face of the bearing seal.

Figure 4:
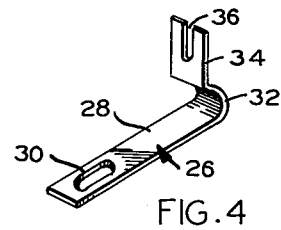
FIG. 4 is a perspective view of the resilient clip shown in FIG. 3.

The center of the underside 16 of head 12 is formed with a strengthened pillar 24 thereon in the central area defined within the bottom of the legs 18 about the respective openings 20. Referring to FIG. 4, a resilient spring steel or the like clip member 26 has a straight portion 28 with an opening 30 therein and a bent portion 32 leading to a terminal end portion 34 having a notch 36 therein. There are four such clips 26, one for each of the legs 18 to which they are attached. The ends 34 of the clips 26 are positioned in stacked relation one over the other and fastened in place by a top plate 38 and a screw 40 passing therethrough. Each of the clips 26 is fastened to a respective leg 18 by a screw member 42 passing through the respective openings 30 in each of the members 26. With this arrangement, keeping in mind the flexibility gained by the limited loose fit of the tops of the legs 18 in their respective openings 20, there is a controlled, limited amount of play or looseness of each of the legs 18 against and prevented by the respective spring steel clips 26 so that under certain circumstances of force, the legs will reposition themselves in response to force on the head 10 in order to adjust and conform the legs and the feet 22 to the position of the seal 44 against which the tool and feet 22 is applied, thereby gradually working the seal into aligned position.

Figure 5:
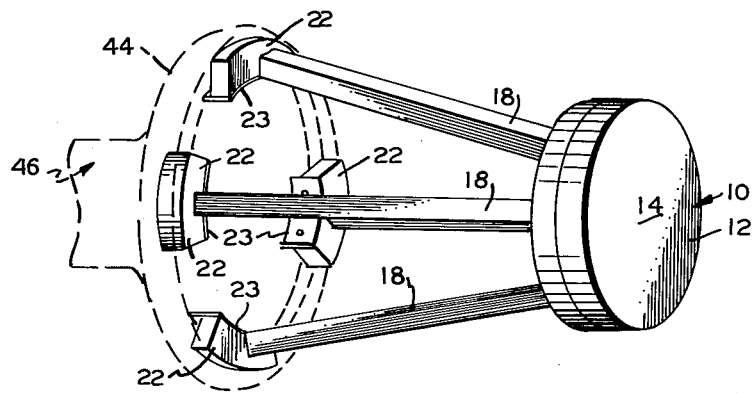
FIG. 5 is a perspective view of the tool shown in FIG. 1 positioned in place on a diagrammatically dotted line grease seal for driving same in place.

In the operation of the device, referring to the perspective view shown in FIG. 5, the tool 10 is positioned and held by the hand against a diagrammatically dotted circular seal 44 which is to be placed about a bearing unit and shaft arrangement 46. The feet member 22 are placed in conformity with the substantial shape of the circular seal 44 with the protruding lips of plates 23 against the inside face of the seal and the tool is held so as to permit the feet 22 and the legs 18 to assume a position of adjustment necessary to place the tool in conformity with the seal and the initial angle thereof. Preliminary to this, of course, the seal, by sight and by hand, is placed as nearly in alignment as possible so that the amount of dis-alignment is only a fraction of an inch which is a sufficient amount to destroy the utility of the seal under previous methods of seating when the force of striking the seal was misapplied to one particular portion. With the seal in place on the bearing assembly 46 in the position of FIG. 5, the head 10 is tapped or struck a blow from a mallet, a rubber hammer or a steel hammer, and tapped slightly to drive the seal in place. As this occurs, the resilient connection between the spring steel members 26 and their respective legs 20 will permit a sufficient and controlled amount of resilient adjustment or movement to allow the force applied to the head 10 to distribute itself at those places where the least resistance is felt, thereby preventing an abnormal amount of force being applied to any one particular portion of the seal 44.

For light work and for work where only a small amount of force is being employed and where the seating of the seal does not involve large, heavy blows from hammers and the like, the device may be constructed from hard wood or plastic. For more durable use and for heavier work, the device should be constructed from steel or from suitable tool stock and the feet 22 may be constructed from nylon moulded pieces. Or, if desired, the legs 18 may be constructed from nylon, which has some amount of shock absorbing characteristic and is very durable in operation.

While I have shown and described a particular embodiment of my invention, this is by way of illustration only and is not to be construed as any sort of limitation on the scope thereof, since various alterations, substitutions, eliminations, changes, deviations, and modifications may be made in the embodiment shown without departing from the scope of my invention, as shown in the appended claims.

I claim:

1. In a seal setting tool of the class described, a striking member having an exposed, upper striking surface thereon adapted to be struck thereon for setting a seal in place, a plurality of seal setting leg members positioned on said striking member and each having the upper end thereof adjustably secured to said member for limited but universal movement thereon, a resilient spring clip attachment member having one end thereof attached to a respective leg and having the other end thereof attached to the striking member for fixing the initial relative position of each of said leg members, whereby said leg members are resisted from unlimited movement from said position by the spring member, all of said leg members projecting outwardly from said striking member and converging thereon at the top and diverging therefrom at the bottom and terminating at substantially the same distance from the surface of said striking member, an arcuate foot member attached on each of said legs at the bottom terminal end thereof and in one position each occupying a portion of an arc of a circle and altogether being in substantial alignment in one position of all of said legs whereby said feet member together define a broken circle which includes an anticipated size of a grease seal to which the device is adapted to contact for driving same in place and said legs and feet being relatively movable to conform to the shape of said seal as it is driven in place.

2. In a seal setting tool of the class described, a head member having an exposed, upper face thereon adapted to be struck thereon for setting a seal in place, a plurality of seal setting leg members positioned on said head and each having the upper end thereof adjustably secured on said head for limited but universal movement, a resilient attachment member having one part attached to a respective leg and having another part thereof attached to the said head member for fixing the initial relative position of each of said leg members, whereby said leg members are resisted from unlimited movement from said position in their respective opening by the resilient member, all of said leg members projecting outwardly from said head member and converging thereon at the top and diverging therefrom at the bottom and terminating at one position substantially the same distance from the surface of said head member, all of the outward ends of said legs being in alignment in one position whereby said legs together define a broken circle which includes an anticipated size of a grease seal to which the device is adapted to contact for driving same in place and said individual legs being movable to conform to the position of said seal.

3. In a seal setting tool of the class described, a circular head member having an exposed, upper face thereon adapted to be struck thereon for setting a seal in place and having a plurality of sockets formed on the underside thereof, a plurality of seal setting leg members positioned on said head and each having the upper end thereof loosely inserted in a respective socket in said head, a resilient spring clip attachment member having one end thereof attached to a respective leg and having the other end thereof attached to the center portion of said head member, whereby said leg members are resisted from unlimited movement in their respective socket by the direction of the spring, all of said leg members projecting outwardly from said head member and converging thereon at the top and diverging therefrom at the bottom and terminating at substantially the same distance from the surface of said head member, an arcuate foot member attached on each of said legs at the bottom terminal end thereof and each occupying a portion of an arc of a circle and altogether being in substantial alignment in one position of all of said legs whereby said feet member together define a broken circle which includes an anticipated size of a grease seal to which the device is adapted to contact for driving same in place.

4. In a seal setting tool of the class described, a striking head, a plurality of seal-setting leg members each having one end thereof secured to said head for limited but universal movement, resilient means interposed between the secured end of each of said leg members and said striking head for fixing the initial relative position of each of said leg members, whereby said leg members are resisted from movement from said position at their respective secured end, all of said leg members projecting outwardly from said head to a terminal end which terminates at substantially the same distance from the secured end, a seal setting foot on each of said legs at the bottom terminal end thereof and altogether said feet being in substantial alignment in one position of all of said legs whereby said feet members together define a closed arc which includes an anticipated size of a grease seal to which the device is adapted to contact for driving same in place.

5. In a seal setting tool of the class described, a striking head, a plurality of seal-setting leg members each having one end thereof secured to said head for limited but universal movement, a resilient spring clip attachment member having one end thereof attached to a respective leg at the respective secured end and having the other end thereof attached to said head for fixing the initial relative position of each of said leg members, whereby each of said leg members are resisted from movement from said position by the respective spring clip attachment member, all of said leg members projecting outwardly from said head and converging thereon at the top and diverging therefrom at the bottom terminating at substantially the same distance from said secured end, each of said legs at the bottom terminal end thereof each occupying a portion of an arc of a circle and altogether being in substantial alignment in one position of all of said legs whereby said terminal ends together define a broken circle which includes an anticipated size of a grease seal to which the terminal ends are adapted to contact for driving same in place.

References Cited in the file of this patent

UNITED STATES PATENTS

| | | |
|---|---|---|
| 1,641,754 | Glover et al. | Sept. 6, 1927 |
| 2,736,955 | Fuglie | Mar. 6, 1956 |